(12) United States Patent
Asadullah et al.

(10) Patent No.: US 9,207,915 B2
(45) Date of Patent: Dec. 8, 2015

(54) METHODS FOR DETECTING PLAGIARISM IN SOFTWARE CODE IMPLEMENTING A DESIGN PATTERN, INCLUDING DETECTING A DESIGN PATTERN IMPLEMENTED IN THE SOFTWARE CODE AND CREATING A REPRESENTATION THAT IMPLEMENTS PROGRAM LOGIC ASSOCIATED WITH AT LEAST ONE FUNCTION IMPLEMENTING THE DESIGN PATTERN

(71) Applicant: Infosys Limited, Bangalore (IN)

(72) Inventors: Allahbaksh Mohammedali Asadullah, Hubli (IN); Vasudev Damodar Bhat, Hubli (IN); Srinivas Padmanabhuni, Bangalore (IN); Basava Raju Muddu, Bangalore (IN); Ilan Stern, Santiago (CL)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/998,561

(22) Filed: Nov. 7, 2013

(65) Prior Publication Data

US 2014/0165039 A1    Jun. 12, 2014

(30) Foreign Application Priority Data

Nov. 7, 2012 (IN) .......................... 4661/CHE/2012

(51) Int. Cl.
*G06F 9/44* (2006.01)

(52) U.S. Cl.
CPC ..................... *G06F 8/36* (2013.01)

(58) Field of Classification Search
CPC ............. G06F 8/611; G06F 8/70; G06F 8/71; G06F 8/72; G06F 8/73; G06F 8/74; G06F 8/75; G06F 8/76; G06F 8/77; G06F 8/78
USPC .......................................................... 717/123
See application file for complete search history.

(56) References Cited

U.S. PATENT DOCUMENTS

| | | | |
|---|---|---|---|
| 6,134,706 A * | 10/2000 | Carey et al. .................. | 717/102 |
| 6,282,698 B1 | 8/2001 | Baker et al. | |
| 6,748,584 B1 | 6/2004 | Witchel et al. | |
| 7,493,596 B2 | 2/2009 | Atkin et al. | |
| 8,782,608 B2 * | 7/2014 | Ackerman et al. ............ | 717/127 |
| 8,819,856 B1 * | 8/2014 | Tiffe et al. ...................... | 726/31 |
| 2007/0256051 A1 * | 11/2007 | Rojer ............................. | 717/104 |
| 2009/0144702 A1 * | 6/2009 | Atkin et al. .................... | 717/121 |
| 2012/0117547 A1 * | 5/2012 | Balakrishnan et al. ........ | 717/136 |

\* cited by examiner

*Primary Examiner* — Li B Zhen
*Assistant Examiner* — Daniel Wei
(74) *Attorney, Agent, or Firm* — Marc S. Kaufman; Mark T. Vogelbacker; Reed Smith LLP

(57) ABSTRACT

Methods and instructions embodied in non-transitory media for the detection of plagiarism in software code implementing a design pattern are described. Steps involved may include receiving input comprising the software code at least one design pattern implemented in the software code, identifying at least one function call to a function in a class implementing the design pattern in the software code, and creating a representation of the called function in the class containing the function call, wherein the function call and the function to which it corresponds is characteristic of the design pattern; and where the created representation implements program logic associated with at least one function implementing the design pattern, including the called function. The function call may be replaced with the representation of the called function. Additionally, the modified code may then be compared with one or more target files.

18 Claims, 4 Drawing Sheets

METHODS FOR DETECTING PLAGIARISM IN SOFTWARE CODE IMPLEMENTING A DESIGN PATTERN, INCLUDING DETECTING A DESIGN PATTERN IMPLEMENTED IN THE SOFTWARE CODE AND CREATING A REPRESENTATION THAT IMPLEMENTS PROGRAM LOGIC ASSOCIATED WITH AT LEAST ONE FUNCTION IMPLEMENTING THE DESIGN PATTERN

RELATED APPLICATION DATA

This application claims priority to India Patent Application No. 4661/CHE/2012, filed Nov. 7, 2012, the disclosure of which is hereby incorporated by reference in its entirety.

FIELD OF THE INVENTION

This technology generally relates to methods and devices for detecting plagiarism in software code and, more particularly, to methods for detecting plagiarism in software code implementing at least one design pattern through the removal of detected design patterns in the software code.

BACKGROUND

Plagiarism is, in general, the act of copying work authored by another, including writings or, particularly, code, and willfully failing to attribute or acknowledging the original author. Plagiarism is easier to carry out and easier to hide, than it has ever been before because of the increasing ubiquity of information and the diversity of information sources available through the internet. To that end, several tools have been developed to detect plagiarism in writings of software code.

Extant tools or techniques for the detection of plagiarism in software code generally operate by means of comparing or matching suspect source code file by file. In some instances, a source code file may be preprocessed or converted to some intermediate form and a matching algorithm that maps the source file to a target file may be applied thereafter. The output of such an operation may generally take the form of a number or a percentage that indicates a degree of plagiarism in the source file.

However, such an approach, absent more, may be unable to efficiently detect plagiarism that is intelligently distributed across multiple source files and obscured by exploiting the structure of the software code. For example, distributing plagiarized material across multiple files, classes or functions in the body of the source code may successfully serve to circumvent a plagiarism detection method using a percentage or threshold based output metric by limiting copied material in each of the compared source files to a level below that flagged by the tool. One such technique may involve the obscuring of plagiarized source code by adapting the plagiarized code into object oriented code through the adoption of one or more software design patterns into the code files.

A method for plagiarism detection that can address such a scenario is therefore needed.

SUMMARY

Embodiments of the present invention address the detection of plagiarized software code in software code files, where the plagiarized code incorporates the use of one or more software design patterns.

Such detection may be performed, in accordance with an exemplary embodiment, by a computing device comprising one or more processors, a memory coupled to the one or more processors and programmed instructions in the memory whereby the one or more processors are configured to execute a method of plagiarism detection in software code implementing at least one design pattern. Such a method may comprise receiving a first file comprising the software code, and a second file comprising the at least one design pattern implemented in the software code, the software code comprising at least one function and at least one class. The method may additionally comprise identifying at least one function call to a function in a class implementing the design pattern in the software code, and resolving the at least one identified function call, wherein resolving comprises creating a representation of the called function in the class containing the function call, wherein the function call and the function to which it corresponds is characteristic of the design pattern identified by means of the second file; and the created representation implements program logic associated with at least one function implementing the design pattern, including the called function; and replacing the function call with the representation of the called function in the first file. The method may additionally comprise comparing the modified source code file with a target file in some embodiments of the present invention.

In an additional embodiment of the present invention, a non-transitory computer readable medium is disclosed receiving a first file comprising the software code, and a second file comprising the at least one design pattern implemented in the software code, the software code comprising at least one function and at least one class; identifying at least one function call to a function in a class implementing the design pattern in the software code; and resolving the at least one identified function call, wherein resolving comprises: creating a representation of the called function in the class containing the function call, wherein: the function call and the function to which it corresponds is characteristic of the design pattern identified by means of the second file; and the created representation implements program logic associated with at least one function implementing the design pattern, including the called function; and replacing the function call with the representation of the called function in the first file.

This technology provides a number of advantages including providing more effective ways for the detection of copied software code by normalizing or de-patterning software code.

DETAILED DESCRIPTION

Detecting plagiarism in software code, particularly object oriented software code, presents a number of complexities; more particularly, plagiarized content may be hidden by exploiting the structure of the software code. When software code is refactored, opportunities to include or hide plagiarized code may be present, for example. Convention plagiarism detection approaches, in comparing software code file-by-file with one or more target files, may preprocess the code in each file into tokens or program dependency graphs. Such matching of structured code in a single file with one or more target files may provide incomplete results where the structure of the code is exploited to distribute plagiarized code across multiple files or classes.

One such popular method of structuring software code is in implementing a design pattern in the code. Through the implementation of a design pattern, loose, unstructured or procedural software code may be converted into structured and extensible object oriented code. Copied software code may thus be adapted into functional programs through the embedding of such code in 'pattern' classes, that is, the one or more classes involved in implementing the design pattern structure.

Therefore, robust plagiarism detections approaches on object oriented software code may necessitate the de-structuring or removal of design patterns, prior to the application of text matching or plagiarism detection tools upon the code.

Methods, devices and computer readable media whereby the present invention may be embodied are described with respect to the following figures and explanations.

Figure 1:
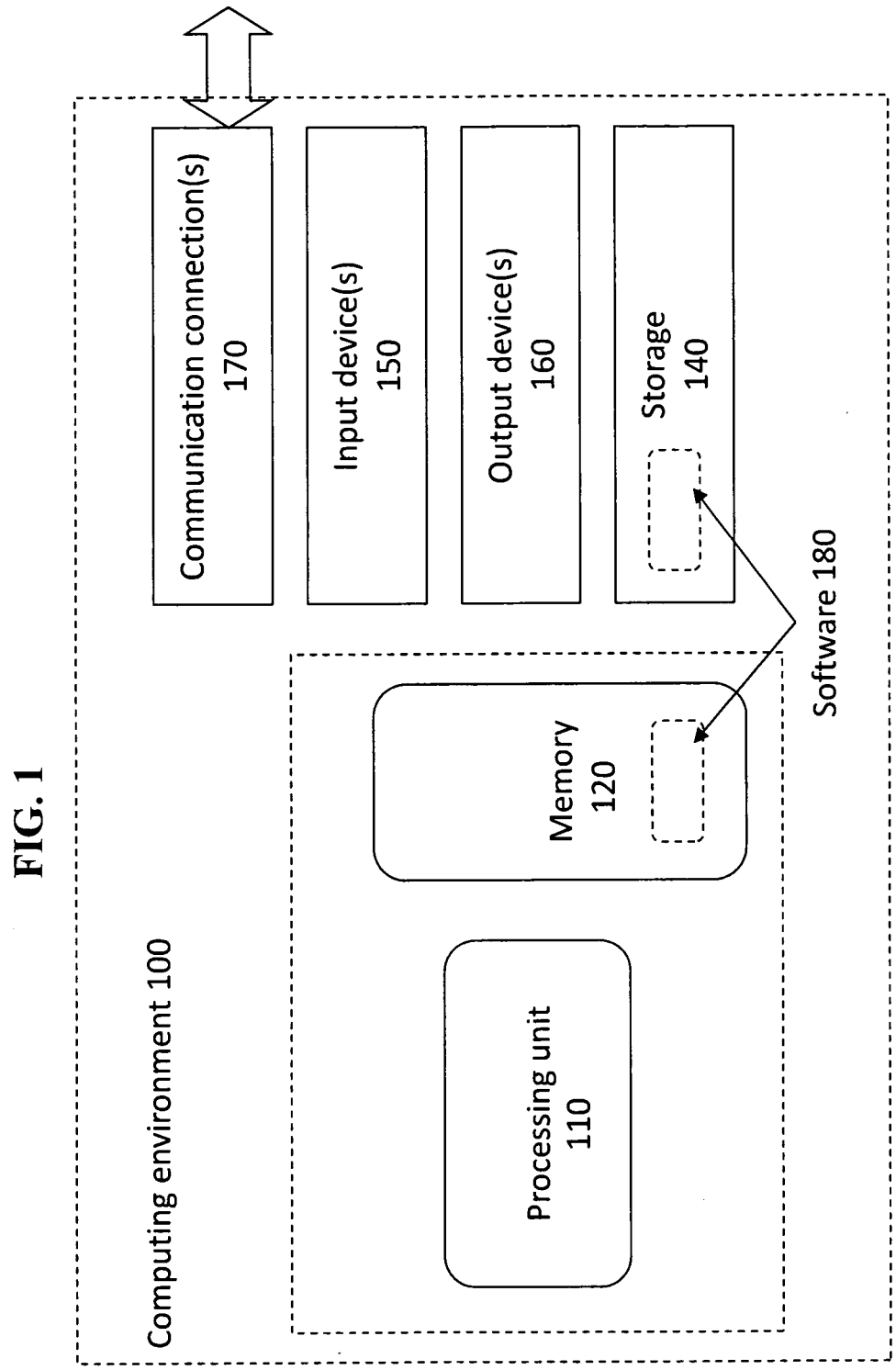
FIG. 1 is a block diagram of an exemplary environment which comprises an exemplary computing device for detecting plagiarism, in accordance with an embodiment.

First, an exemplary environment 100 with a computing device comprising a processing unit 110 and a memory that is configured to detect plagiarism in software code is illustrated in FIG. 1. The environment 100 additionally includes at least one communication connection 170, an input device 150, such as a keyboard or a mouse or both, an output device 160, and storage media 140.

The computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

An exemplary method for detecting plagiarism in software code will now be described with reference to FIGS. 2-4.

Figure 2:
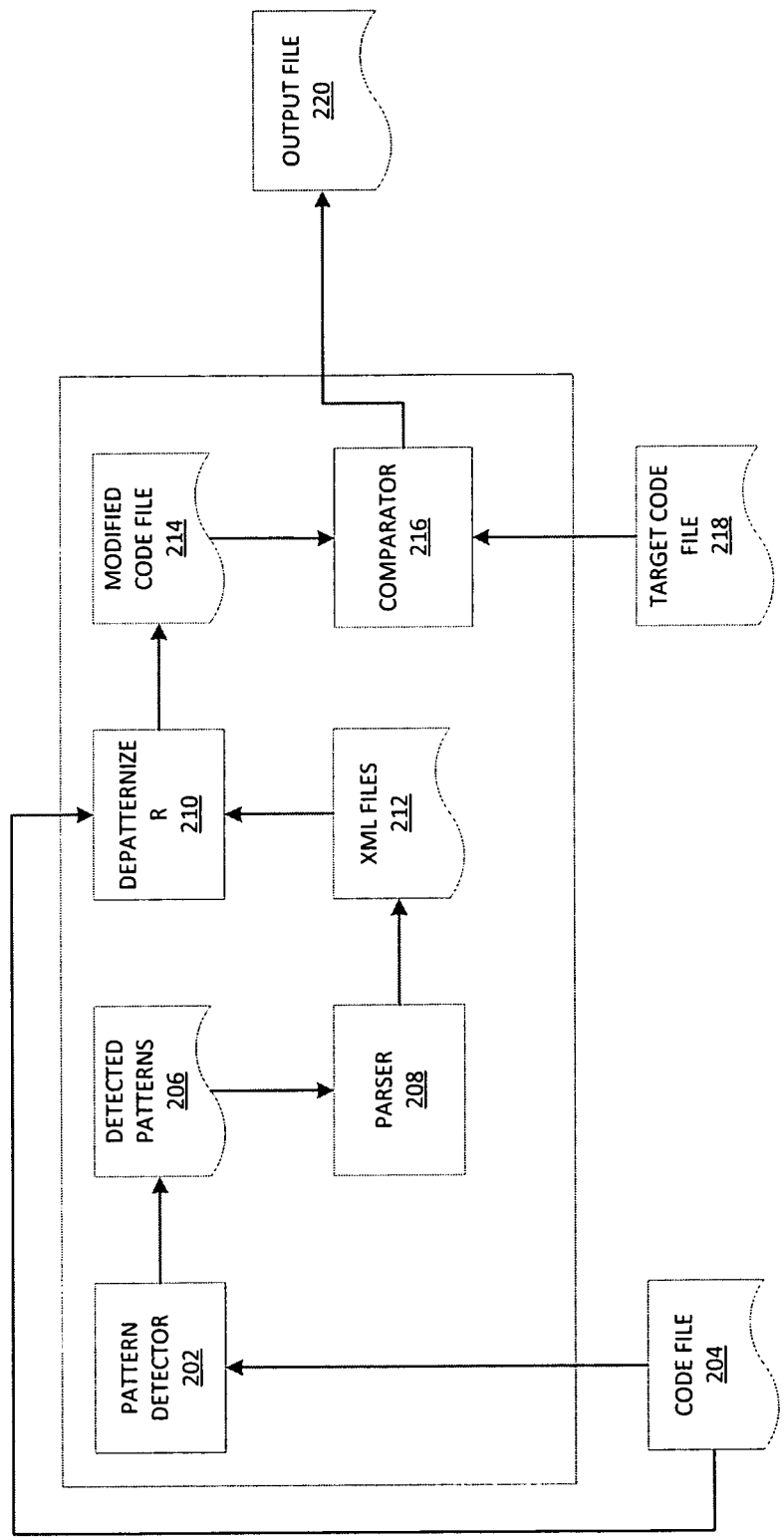
FIG. 2 is a schematic representation of the de-patterning of software code, in accordance with an embodiment.

Referring now to FIG. 2, the system of operation of the plagiarism detection mechanism in the instant invention is illustrated. As described, such a system may involve a pattern detector, 202, to which a code file 204 is provided as input. The code file may be otherwise referred to as the first file. The received code may be input to the pattern detector and information identifying the adoption of design patterns in the code may be generated thereby. The output of the pattern detector may be provided to a parser 208. The output file of the pattern detector may thereby be converted to an intermediate format readable by the depatternizer 210 by the parser. In an example implementation, the intermediate file is an XML file, as illustrated in table 1. The parser may generate at least one intermediate file for each design pattern identified by means of the pattern detector 202.

TABLE 1

```
<!--Required root tag-->
<patterns>
    <!--Patterns detected with the corresponding pattern name-->
    <pattern name="PatternName1">
        <!--Specific instance of the pattern-->
        <instance>
            <!--Specific roles detected within the pattern instance-->
            <role name="RoleName1" element="ElementName1" />
            <role name="RoleName2" element="ElementName2" />
            <!-Multiple roles...-->
            <role name="RoleNameN" element="ElementName3" />
        </instance>
    </pattern>
    <pattern name="PatternName2">
        <instance>
            <!-Roles...-->
        </instance>
        <instance>
            <!-Roles...-->
        </instance>
        <!-Multiple instances...-->
        <instance>
            <!-Roles...-->
        </instance>
    </pattern>
    <!-Multiple patterns...-->
    <pattern name="PatternNameN">
        <!-Instances...-->
    </pattern>
</patterns>
```

The depatternizer 210 may receive as input both the intermediate files 212 generated by the parser and the code file, or first file, 204. The depatternizer component may generate or modify the input code file 204, providing as output a new or modified code file 214. The modified code file thus generated may comprise the source code from at least the first file where the structure of the source code is changed in that the design pattern previously adopted, that is, adopted in the first file, is removed.

More specifically, the operation of the depatternizer component is further detailed with reference to FIG. 3.

Figure 3:
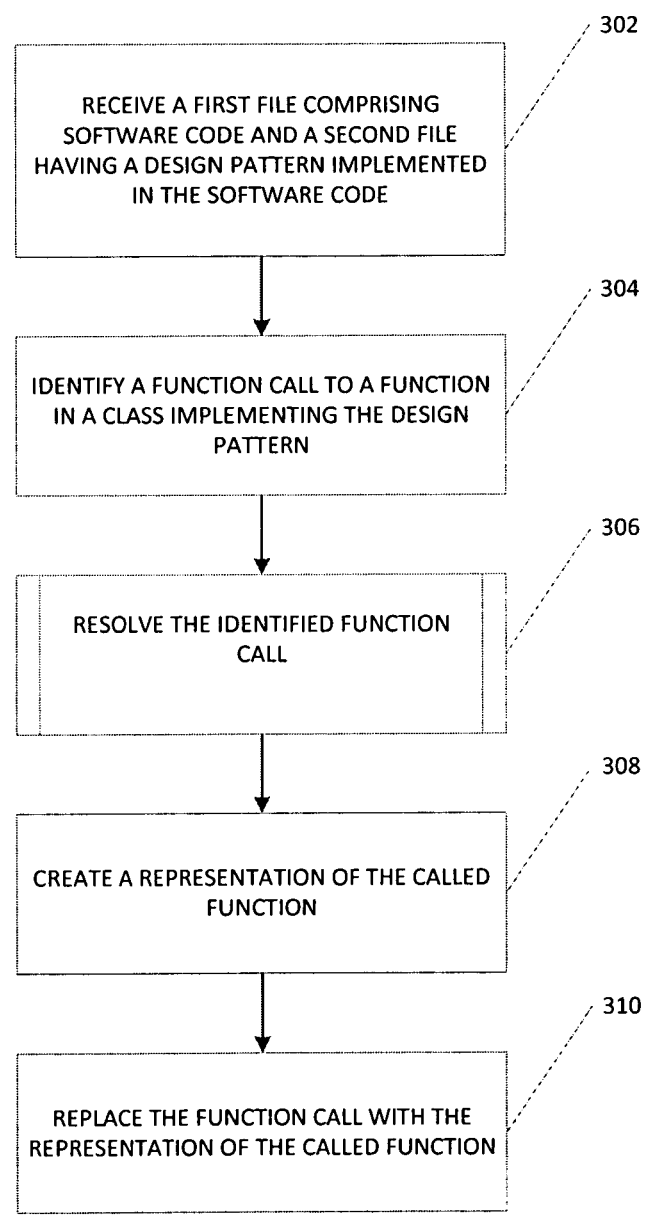
FIG. 3 is a flowchart of a method for detection of clones in software code comprising a design pattern, in accordance with an embodiment of the present invention.

Referring now to FIG. 3, in a first step 302, a first file comprising software code and a second file comprising a design pattern identified in the software code are received by the depatternizer. The input first file may contain the software code for which the plagiarism check is to be performed. The second file may be an XML file structured along that previously illustrated in table 1. The software code may be implemented along the lines of a known design pattern, including at least a visitor design pattern or a chain-of-responsibility design pattern. The software code may be written in an object oriented programming language, such as Java. On receiving the files, the input XML file may be read and the identified patterns thereby obtained. As an illustration, sample code representative of a 'Visitor' design pattern is shown in Table 2.

TABLE 2

```
//AbstractElement
public interface Visitable{
        public void accept(Visitor visitor);
}
//ConcreteElement
public class Book implements Visitable{
        private double price;
        private double weight;
        //accept the visitor
        public void accept(Visitor vistor){
        visitor.visit(this);
        }
        public double getPrice( ){
        return price;
        }
        public double getWeight( ){
        return weight;
        }
}
//AbstractVisitor
public interface Visitor{
        public void visit(Visitable visitable);
}
//ConcreteVisitor
public class PostageVisitor implements Visitor{
        private double totalPostageForCart;
        //collect data about the book
        public void visit(Book book){
            //assume we have a calculation here related to weight and
            price
            //free postage for a book over 10
            if(book.getPrice() < 10.0){
                totalPostageForCart += book.getWeight() * 2;
            }
        }
    //add other visitors here
    public void visit(CD cd){...}
    public void visit(DVD dvd){...}
    //return the internal state
    public double getTotalPostage( ){
        return totalPostageForCart;
    }
}
//Client
public class ShoppingCart{
        //normal shopping cart items
        private ArrayList<Visitable> items;
        public double calculatePostage( ){
            //create a visitor
            PostageVisitor visitor = new PostageVisitor( );
            //iterate through all items
            for(Visitable item: items){
                item.accept(visitor);
            }
```

TABLE 2-continued

```
            double postage = visitor.getTotalPostage( );
            return postage;
        }
}
```

On examining the illustrative first file comprising the data of table 2, the existence of a 'Visitor' design pattern in the code may be determined and reported as XML output. Such a representation is shown by means of table 3.

TABLE 3

```
<pattern name="Visitor">
    <instance>
        <role name="AbstractElement" element="Visitable" />
        <role name="ConcreteElement" element="Book" />
        <role name="AcceptMethod" element="accept" />
        <role name="AbstractVisitor" element="Visitor" />
        <role name="VisitMethod" element="visit" />
        <role name="ConcreteVisitor" element="PostageVisitor" />
    </instance>
</pattern>
```

Then, as in a step 304, a function call to a function implementing the design pattern may be identified. All classes and methods in the first file that participate in the implementation of the design pattern in the software code may be identified. Classes or functions where references to the participating classes or functions exist may be similarly identified and tagged as client classes.

Then, as in a step 306, the identified function call is resolved. In resolving the identified references to classes or functions participating in the design pattern in the client classes, a first step is the creation of an abstract syntax tree of the pattern classes. The constructed abstract syntax tree may have specific nodes for each element of the software code. For example, the abstract syntax tree representation may comprise nodes for method declarations, base nodes for class declarations, or assignment operation. The type and nature of method invocations in the acquired source code are identified by examining a node of the abstract syntax tree with which the code is associated.

Then, as in a step 308, a representation of the called function may be created, and, as in a step 310, the function call may be replaced with the representation of the called function. Representations may be created in the client classes, where the call to the function defined in the pattern classes exists. The representation created may be functionally equivalent to the respective called method that is defined in a pattern class. The representation created is therefore distinct for each identified design pattern. In an example implementation, for the 'Visitor' design pattern, a conditional construct may be created for each of the 'visit' methods of the pattern class. The conditional construct may comprise code from its corresponding 'visit' method. An example implementation where the 'Visitor' pattern is removed or replaced in a client class by a representation of the pattern class is shown in Table 4. Source code associated with the invoked methods may be acquired by copying, for example copying to a local memory, the software code information in, or associated with, the nodes of the branch of the abstract syntax tree by which the invoked method is represented. When all identified calls to any pattern class are similarly replaced in each of the client classes, the input source code is depatternized, and the input first file may be modified to include the depatternized code.

TABLE 4

```
//Modified Client
public class ShoppingCart{
    private ArrayList<Visitable> items;
    public double calculatePostage( ){
        PostageVisitor visitor = new PostageVisitor( );
        for(Visitable item: items){
            //CHANGED ACCEPT CALL
            PostageVisitor_visit(item);
        }
        double postage = visitor.getTotalPostage( );
        return postage;
    }
    //New VISIT METHOD
    public void PostageVisitor_visit(Visitable Visitable_instance){
        if(Visitable_instance.getClass( ).equals(Book)){
            if(book.getPrice( ) < 10.0){
                totalPostageForCart += book.getWeight( ) * 2;
            }
        }
        else if(Visitable_instance.getClass( ).equals(CD)){...}
        else if(Visitable_instance.getClass( ).equals(DVD)){...}
    }
}
```

Referring again to FIG. 2, in some embodiments, the modified code file 214 thus generated may be input to a comparator component 216. A target code file 218 may be additionally input. The target code file may contain software code that the user desires to perform a plagiarism analysis upon. The comparator 216 may then match the text of the modified code file with that of the target file.

Figure 4:
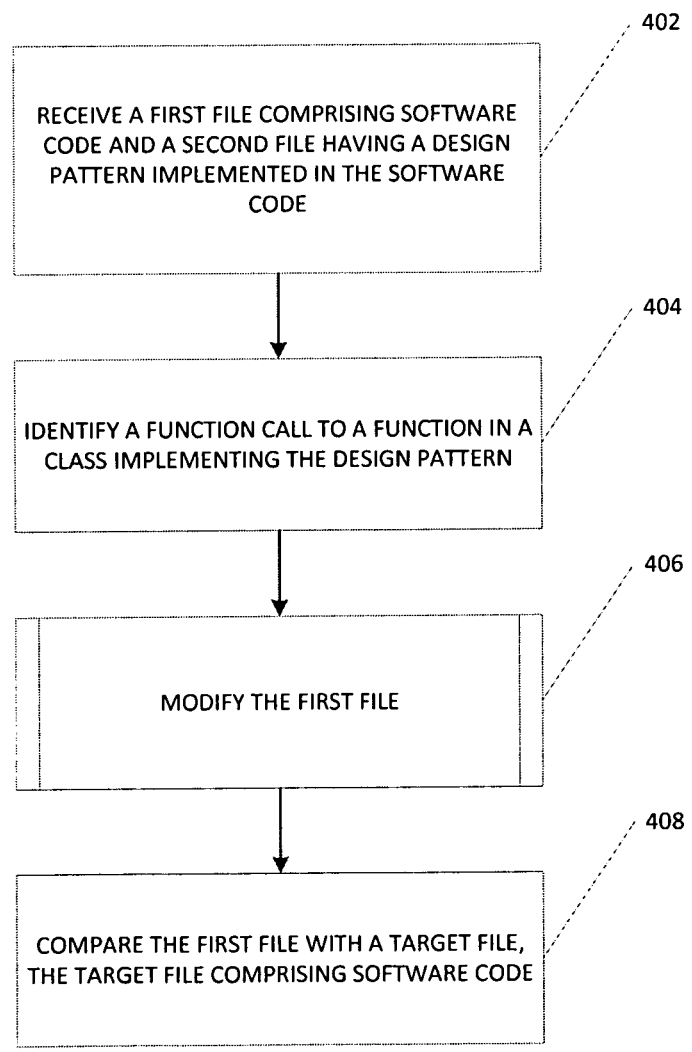
FIG. 4 is a flowchart of a method of detecting plagiarism in a de-patterned code file with reference to a compared target file.

An embodiment incorporating matching is additionally illustrated in FIG. 4, where a first file comprising software code and a second file comprising a design pattern implemented in the code is received, as in 402. Function calls in the software code belonging to classes implementing the design pattern are identified, as in 404 and the first file is then modified, as in 406. The modification may comprise resolving a function call, creating a representation of one or more pattern classes that implement the design pattern in the software code and replacing the function calls with its corresponding representation. Additionally, as in 408, the text in a target file may be matched with the first file, and, in some embodiments, the matching operation may provide a code match index that indicates the quantum of plagiarized material in the first file as output.

In an additional embodiment, a Chain-of-Responsibility pattern may be depatternized. To depatternize the chain of responsibility pattern in the input software code file, all pattern classes and their methods are identified by means of an abstract syntax tree constructed of the pattern classes. Where methods of the pattern are called in a client class, a representation of the called method is created. The representation thus created may comprise a loop construct, such as a do-while loop. The loop construct may comprise the code of the method that is present in its pattern class. The method call in the client class is then replaced with the created representation.

The examples may also be embodied as a non-transitory computer readable medium having instructions stored thereon for one or more aspects of the technology as described and illustrated by way of the examples herein, which when executed by a processor or configurable logic, cause the processor to carry out the steps necessary to implement the methods in the examples, as described and illustrated herein.

Having thus described the basic concept of the invention, it will be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A computing device comprising:
one or more processors;
a memory coupled to the one or more processors and programmed instructions in the memory whereby the one or more processors are configured to execute a method of plagiarism detection in software code implementing a design pattern, the method comprising:
    detecting at least one design pattern implemented in the software code, the at least one design pattern comprising at least one visitor pattern;
    receiving a first file comprising the software code, and a second file comprising the at least one design pattern implemented in the software code, the software code defining at least one function and at least one class;
    identifying at least one function call to a function in a class implementing the design pattern in the software code; and
    resolving the at least one identified function call, wherein resolving comprises:
        creating a representation of the called function in the class containing the function call, the created representation comprising a conditional construct corresponding to each function in a class implementing the visitor pattern, wherein:
            the function call and the function to which it corresponds is characteristic of the design pattern identified by means of the second file; and
            the created representation implements program logic associated with at least one function implementing the design pattern, including the called function; and
        replacing the function call with the representation of the called function in the first file.

2. The method as claimed in claim 1, further comprising comparing the modified first file with a target file, the target file comprising software code.

3. The method as claimed in claim 2, wherein the created representation is a function comprising the software code of the called function.

4. The method as claimed in claim 2, wherein the design pattern comprises a chain of responsibility pattern.

5. The method as claimed in claim 4, wherein the function call is a call to a function in a class implementing the chain of responsibility pattern.

6. The method as claimed in claim 5, wherein the created representation is a function comprising the software code of the called function.

7. The method as claimed in claim 4, wherein the created representation comprises at least one loop construct, wherein the loop construct comprises a code block corresponding to each function in the class implementing the chain of responsibility pattern.

8. The method as claimed in claim 2, wherein comparing comprises matching the text of the first file with the target file and generating a matching index variable, wherein the value of the matching index is determined by the matching of the files.

9. The method as claimed in claim 8, further comprising checking the value of the matching index and generating an alert if the value of the matching index exceeds a predetermined threshold value.

10. A non-transitory computer readable medium having stored thereon instructions for performing a method of detecting plagiarism in software code, which, when executed by at least one processor, causes the processor to perform steps comprising:
- detecting at least one design pattern implemented in the software code, the at least one design pattern comprising at least one visitor pattern;
- receiving a first file comprising the software code, and a second file comprising the at least one design pattern implemented in the software code, the software code comprising at least one function and at least one class;
- identifying at least one function call to a function in a class implementing the design pattern in the software code;
- resolving the at least one identified function call, wherein resolving comprises:
  - creating a representation of the called function in the class containing the function call, the created representation comprising a conditional construct corresponding to each function in a class implementing the visitor pattern, wherein:
    - the function call and the function to which it corresponds is characteristic of the design pattern identified by means of the second file; and
    - the created representation implements program logic associated with at least one function implementing the design pattern, including the called function; and
  - replacing the function call with the representation of the called function in the first file.

11. The instructions as claimed in claim 10, further comprising comparing the modified first file with a target file, the target file comprising software code.

12. The instructions as claimed in claim 11, wherein the created representation is a function comprising the software code of the called function.

13. The instructions as claimed in claim 11, wherein the design pattern comprises a chain of responsibility pattern.

14. The instructions as claimed in claim 13, wherein the function call is a call to a function in a class implementing the chain of responsibility pattern.

15. The instructions as claimed in claim 14, wherein the created representation is a function comprising the software code of the called function.

16. The instructions as claimed in claim 13, wherein the created representation comprises at least one loop construct, wherein the loop construct comprises a code block corresponding to each function in the class implementing the chain of responsibility pattern.

17. The instructions as claimed in claim 11, wherein comparing comprises matching the text of the first file with the target file and generating a matching index variable, wherein the value of the matching index is determined by the matching of the files.

18. The instructions as claimed in claim 17, further comprising checking the value of the matching index and generating an alert if the value of the matching index exceeds a predetermined threshold value.

* * * * *